March 24, 1925.  1,531,168
L. BATCHLOR
PUMP
Filed March 25, 1924   2 Sheets-Sheet 1
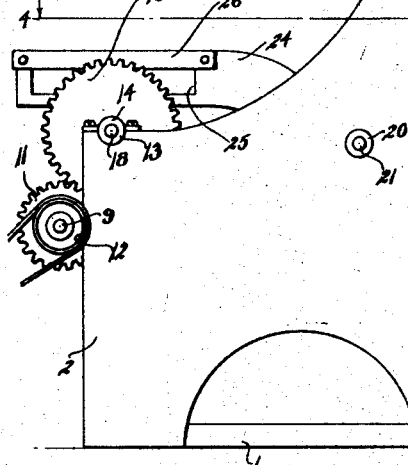
Fig.1.
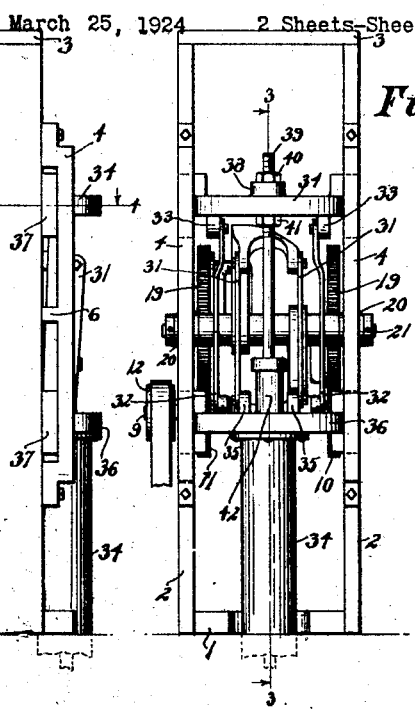
Fig.2.
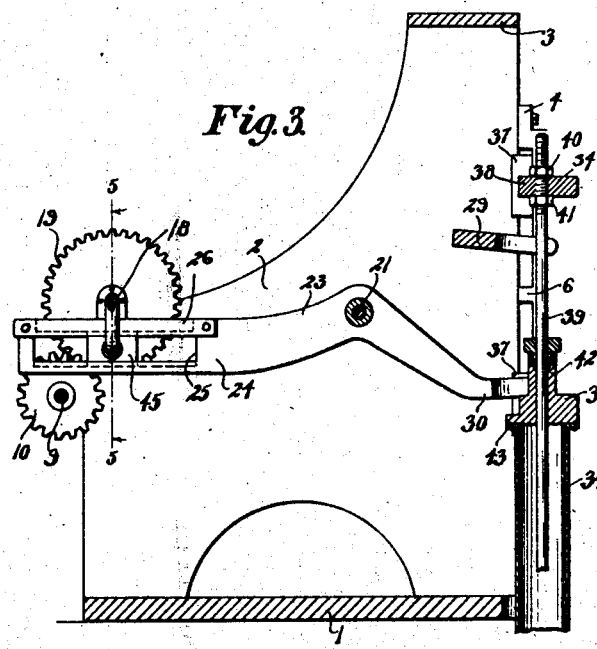
Fig.3.
Fig.7.
Landon Batchlor.
INVENTOR
BY Victor J. Evans.
ATTORNEY
WITNESS:

March 24, 1925. 1,531,168
L. BATCHLOR
PUMP
Filed March 25, 1924   2 Sheets-Sheet 2
Fig. 4.
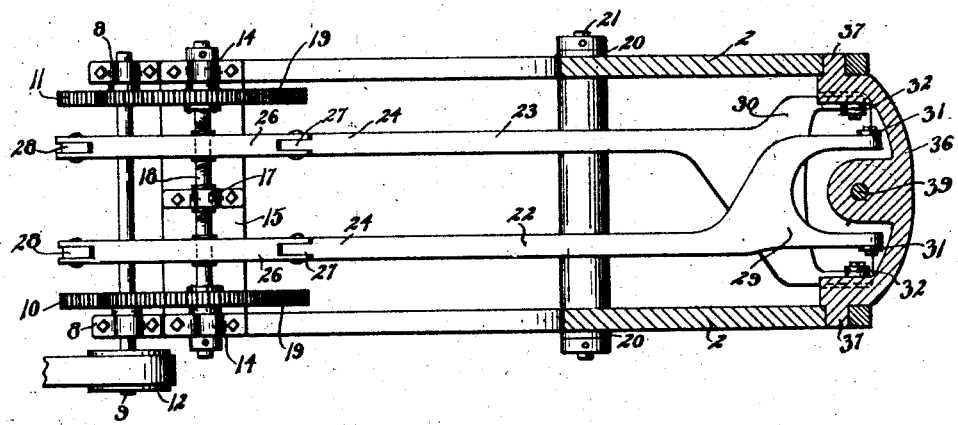
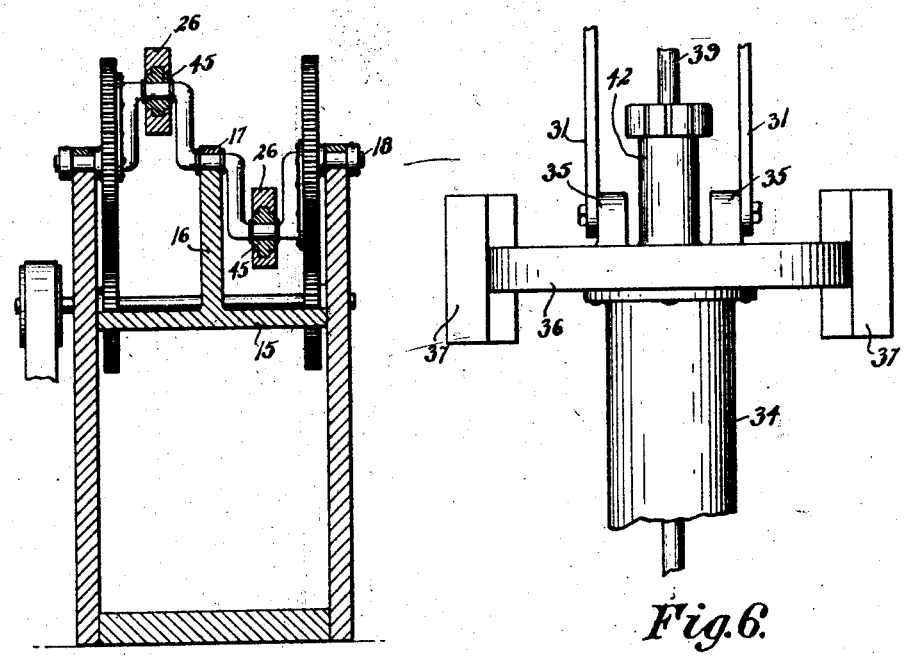
Fig. 5.   Fig. 6.
Landon Batchlor.
INVENTOR
BY Victor J. Evans.
ATTORNEY
WITNESS:

Patented Mar. 24, 1925.

1,531,168

UNITED STATES PATENT OFFICE.

LANDON BATCHLOR, OF LAWRENCEBURG, INDIANA.

PUMP.

REISSUED

Application filed March 25, 1924. Serial No. 701,784.

*To all whom it may concern:*

Be it known that I, LANDON BATCHLOR, a citizen of the United States, residing at Lawrenceburg, in the county of Dearborn and State of Indiana, have invented new and useful Improvements in Pumps, of which the following is a specification.

My present invention has reference to a double acting pump for deep wells, and my object is to simplify and improve the existing art by producing an apparatus of this character by the use of which the sucker rod and working barrel will be rapidly reciprocated in opposite directions to produce a continuous flow of water or other fluid.

The invention further resides in the construction, combination and operative association of parts such as is disclosed by the drawings which accompany and which form part of this application.

In the drawings:—

Figure 1 is a side elevation of a pump in accordance with this invention.

Figure 2 is a front elevation thereof.

Figure 3 is a sectional view on the line 3—3 of Figure 2.

Figure 4 is a sectional view on the line 4—4 of Figure 1.

Figure 5 is a sectional view on the line 5—5 of Figure 1.

Figures 6 and 7 illustrate details.

The frame of my improvement includes a base 1, sides 2 which have their front portions projected and connected by a top plate 3. The sides, at their outer or front edges have secured thereto notched plates 4 that provide guides for the cross heads hereinafter referred to. The central portion of each of the plates 4 has an inner projection 6 that bridges the elongated notch therein.

Integrally formed on the rear edges of the sides 2 of the frame there are bearing members 7. The removable cap plates for the bearing members are indicated by the numeral 8, and journaled in the said bearings there is a shaft 9 that carries pinions 10 and 11 respectively. Outward of the pinion 11 there is secured on the shaft 9 a pulley wheel 12 around which is trained a belt connected to an engine or other suitable source of power (not shown).

The upper edges of the sides at the rear of the frame are provided with bearing members 13, the removable caps therefor being indicated by the numeral 14. The frame, below the bearings 13 has its sides connected by an element 15 from which there centrally arises a plate 16 provided, at its upper portion with a bearing. The cap plate for the bearing is indicated by the numeral 17. In the bearings 14 and in the bearing provided by the plate 16 there are journaled the straight portions of a crank shaft 18. The outer straight ends of the crank shaft have keyed or otherwise secured thereon toothed wheels 19 respectively which are in mesh with the respective pinions 10 and 11.

The frame, in a line with the crank shaft, and nearest the front end thereof, is formed with openings surrounded by bosses 20. In these openings there is journaled a shaft 21. On the shaft 21 there is pivoted a pair of rocker levers 22 and 23 respectively. The rocker levers are disposed at opposite angles. The levers are held in proper spaced relation on the shaft, the spacing means being either in the nature of sleeves arranged on the shaft between the levers and between the bosses of the frame, or the said levers may be formed with outstanding bosses that surround the bearing openings therein. The levers are similarly constructed, the pivoted portions thereof being, however, rounded in opposite directions and from thence provided with straight rearwardly extended arms 24. These arms, adjacent to their outer ends are notched longitudinally, as at 25, and the said notches are closed by plates 26 which have their inner ends bifurcated to engage with ears 27 provided by reducing the opposite sides of the inner wall or shoulder provided by the notches. In a like manner the outer wall or shoulder 27 provided by the notches 25 is reduced from its opposite sides to form the same with an upstanding ear 28, and the plates 26 have their outer ends also bifurcated for the reception of the said ears. The bifurcated ends of the plates are pivotally secured to the respective ears, and in the openings between the plates and rocker arms there are received the cranked portions of the shaft 18. From their rounded pivotally connected portions the rocker levers are extended outwardly, the said extensions being forked, as at 29 and 30 respectively. The forked end 29 of the rocker lever 22 is of a materially less length than the forked end 30 of the rocker lever 23, and pivotally secured to the ends of both forks there are pitmen 31—31 and 32—32. The respective pairs of pitmen are oppositely directed, the pitmen 32 on the lower fork 30 being pivotally secured to depending ears 33 on the upper cross head 34, while the downwardly extending pitmen 31 on the fork 29 are pivotally connected to upstanding ears 35 on the lower cross head 36. Each cross head comprises a substantially arch-shaped body portion having its ends inwardly extended and formed with elongated lugs 37 that are received in the notches provided in the guide plates 4. Each of the cross heads is centrally formed with an inwardly extending lug and through the lug 38 of the upper cross head there is received the sucker rod 39 of the pump. Preferably the upper end of the said rod is threaded and has screwed thereon bolts 40 and 41 which contact with the opposite faces of the lug 38. The sucker rod 39 passes through an upstanding guide sleeve 42 on the central inwardly directed lug 43 on the lower cross head 36. To the sides of the guide sleeve there are arranged the ears to which the pitmen 32 on the upper cross head 34 are connected. Secured on the under face of the lower cross head 36 there is the working barrel 34 of the pump, and through this working barrel the sucker rod is guided.

As my improvement has reference to the means for rapidly reciprocating the working barrel and the sucker rod of any ordinary pump constructions, a detailed description of such pumps will not be entered into.

The cranked portions of the shaft 18 pass through openings in slidable bearings 45. These bearings are in the nature of elongated blocks constructed in sections which are removably associated. The upper and lower edges of the blocks are grooved and these grooves receive therein the lower edges of the notched portions of the rocker levers as well as the closing plates for the notches in the said levers.

It is believed that the foregoing description, when taken in connection with the drawings will fully set forth the construction, operation and advantages of my improvement to those skilled in the art to which such inventions relate, but I desire to state that while I have herein set forth a satisfactory exemplification of my invention, such changes therefrom as fall within the scope of what I claim may be resorted to.

Having described the invention, I claim:—

1. In a pumping apparatus, a frame, oppositely inclined rocker levers pivotally supported thereon, cross heads guided in the frame and pivotally associated with the levers, a sucker rod carried by one of the cross heads, a working barrel carried by the other cross head and receiving the sucker rod therein, and means for rocking the levers.

2. In a pump construction, a frame, oppositely inclined rocker levers pivoted thereon, upper and lower cross heads guided in the frame, links connecting the respective cross heads with the respective rocker arms, a sucker rod on one of the cross heads, a working barrel on the other cross head receiving the sucker rod therethrough, and revoluble means for rocking the levers.

3. In a pumping apparatus, a frame, oppositely inclined rocker levers pivotally supported thereon, upper and lower cross heads guided in the frame, links connecting the respective cross heads with the respective rocker levers, a sucker rod carried by the upper cross head, guide means on the lower cross head through which the sucker rod passes, a working barrel on the lower cross head receiving the sucker rod therethrough, said rocker levers having elongated openings therethrough, a crank shaft journaled on the frame and having its crank portions received in the openings in the levers, and means for revolving the crank shaft.

4. In a pumping apparatus, a frame, vertical guides on the frame, upper and lower cross heads having lugs received in the guides, a sucker rod adjustably secured to the upper cross head and passing through the lower cross head, a working barrel on the lower cross head receiving the sucker rod therethrough, rocker levers having central portions rounded in opposite directions pivotally supported between the side members of the frame, each of said links having one of their ends forked, pitmen secured to the said forks and pivotally secured to the respective cross heads, said levers having their opposite ends notched longitudinally, a removable plate closing the notches, a crank shaft journaled on the frame, grooved bearings on the crank portions of the shaft, received in the notched portions of the levers, toothed wheels on the shaft, a straight shaft journaled in bearings on the frame below the crank shaft, pinions thereon meshing with the toothed wheels, and a pulley on the last mentioned shaft, all as and for the purpose set forth.

In testimony whereof I affix my signature.

his
  LANDON × BATCHLOR.
      mark

Witnesses:
 Martin J. Givan,
 George J. Bachler.